United States Patent Office 3,592,619
Patented July 13, 1971

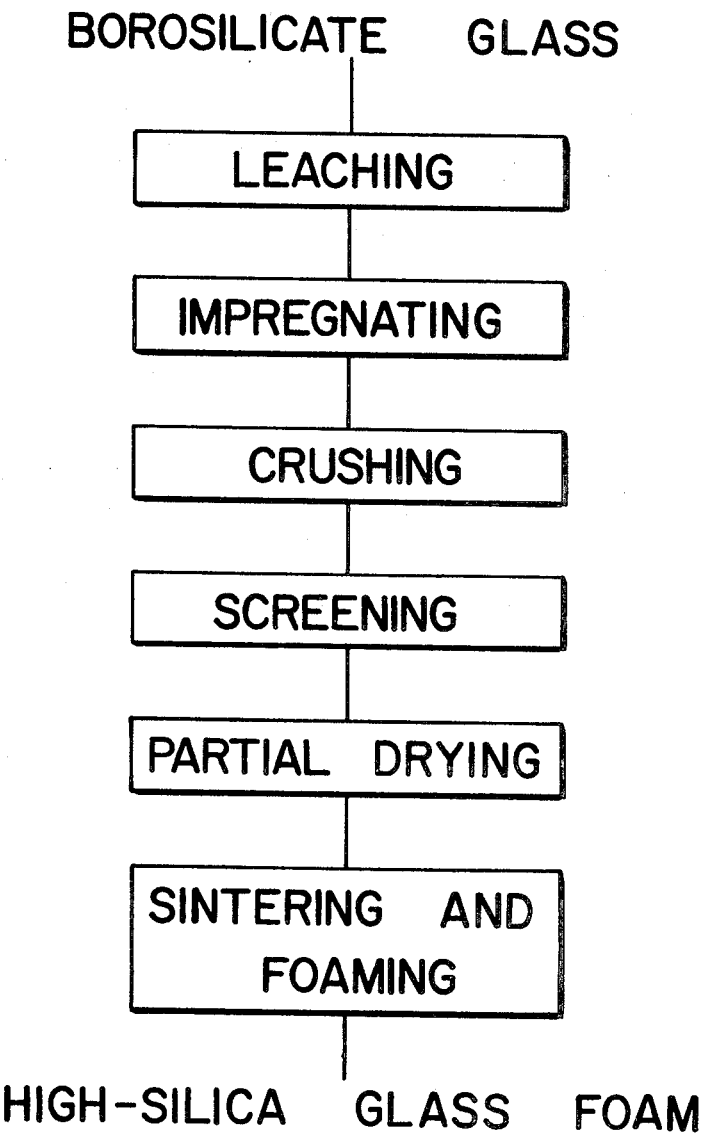

3,592,619
HIGH-SILICA GLASS FOAM METHOD
Thomas H. Elmer and Henry D. Middaugh, Corning, N.Y., assignors to Corning Glass Works, Corning, N.Y.
Filed Apr. 14, 1969, Ser. No. 815,897
Int. Cl. C03b *19/08, 33/00*
U.S. Cl. 65—22         9 Claims

ABSTRACT OF THE DISCLOSURE

A method of making a high-silica glass foam by forming a body of borosilicate glass containing not more than about 70% by weight of silica, the glass being capable of separating into a silica-rich phase and a silica-poor phase, treating the glass with a mineral acid to remove the silica-poor phase and leave a high silica body having a porous structure, impregnating the porous body with a boric oxide solution, crushing and screening the porous body, drying the particulated material to remove excess water, and sintering and foaming the particulated material to form a fused, a low expansion, high silicaglass foam.

---

Foamed or cellulated refractory bodies, that is, inorganic heat resistant bodies expanded by the internal development of non-connecting gas filled cells while the material is in the coalesced or fused state, are well known. Conventional foamed glass products having densities on the order of about 0.15 to 0.30 gram/cc., have been used commercially to provide buoyancy, lightweight and thermal insulation in conjunction with resistance to heat and moisture penetration.

These materials are customarily produced from premelted glass. In general, the process involves premelting a suitable glass composition, pulverizing the glass in admixture with chemically reactable gas producing agents, such as a carbon reducing agent together with an oxidizing agent, depositing a thin layer of the pulverized mixture in a closed pan, heating to the foaming temperature of about 800–900° C., and then annealing over a period of several hours.

Furthermore, consolidated high silica glassware is well known under the designation of "96% silica glass." Such a consolidated nonporous glass body is produced from a porous glass body corresponding in shape and composition, but larger in size, and characterized by a multiplicity of intercommunicating, submicroscopic pores. The basic production steps involved and a particularly suitable family of parent borosilicate glasses are described in U.S. Pat. 2,221,709 issued to Hood et al.

Briefly the method includes (1) forming or fabricating an article of desired shape from a parent borosilicate glass; (2) thermally treating the glass article at a temperature of 500–600° C. for a period of time to separate the glass into a silica-rich phase and a silica-poor phase; (3) dissolving or leaching the silica-poor- phase usually with acid to produce a porous structure composed of the silica-rich phase; (4) washing to remove leaching residue; (5) drying; and (6) thermally consolidating the porous body into a nonporous vitreous article by heating without fusion. The consolidated article has a general shape of the original glass article but is reduced by about ⅓ in volume. The maximum consolidation temperature is above 900° C. and on the order of 1200–1300° C. in higher silica content glasses. The pore size of the porous glass before consolidation is generally within the vicinity of 45–90° A.

Quite surprisingly, we have now discovered a method of making a fused high silica glass foam from leached porous glass particles. The foam is useful in making radomes having broad band frequencies especially in the microwave spectrum. The uniformity of electrical properties combined with the low loss factor over a widely extended temperature range are particularly important properties of the foam for such application. Other characteristics which offer advantages over conventional foams include interconnecting pores, low thermal expansion extremely low alkali metal oxide content, high use temperatures, resistance to devitrification, and uniformity of structure. Further, since no cellulating agents are used the foamed product is free from undesirable contamination.

In accordance with the present invention, we have discovered a method of making a high-silica glass form by forming a body of borosilicate glass containing a maximum of 70% by weight of silica, the glass being capable of separating into a silica-rich phase and a silica-poor phase, treating the glass to remove the silica-poor phase, and leave a high silica body having a porous structure impregnating the porous body with a boric oxide solution, crushing and screening the porous body, drying the particulated material to remove excess water, and sintering and foaming the particulated material to form a fused, low-expansion, high-silica glass foam. Typically the foamed product has a thermal expansion coefficient of about $8 \times 10^{-7}/°$ C.

The accompanying drawing is a flow sheet of the novel process, which while not intended as a definition essentially illustrates the invention.

The base glass used in this process is a borosilicate glass and may be designated by the general formula $R_2O$—$B_2O_3$—$SiO_2$, wherein R is an alkali metal. The glasses must be capable of phase separating into a silica-rich phase and a silica-poor phase and they must be leachable without a heat treatment using a conventional mineral acid, e.g. nitric acid, sulfuric acid or hydrochloric acid. The glass compositions, which may be used herein as given in weight percent on the oxide basis as calculated from the batch and are as follows:

| Ingredient | Percent Broad range | Preferred range |
|---|---|---|
| $SiO_2$ | 55–70 | 58–65 |
| $B_2O_3$ | 20–40 | 20–30 |
| $R_2O$ | 1–10 | 4–9 |
| $Al_2O_3$ | 0–5 | 0–3 |

The silica content should not exceed about 70% by weight, since glasses containing greater amounts require a preliminary heat treatment prior to leaching. Moreover, when the silica content exceeds the preferred range, autoclaving and using hot acids may be required. It is also recommended that as the silica content approaches the higher levels within the prescribed ranges, the glass should be ground and leached in the form of particles or granules. A specific example of a glass illustrating the invention and given in weight percent is as follows:

Ingredient:                             Amount, percent
  $SiO_2$ _____ 61.6
  $Na_2O$ _____ 8.04
  $B_2O_3$ _____ 28.2
  $Al_2O_3$ _____ 1.9
  $As_2O_3$ _____ 0.3

The borosilicate glass in the form of tubing or particles is initialy subjected to an acid leaching treatment. Useful acids are dilute solutions, typically in the range of 1–2 normal solutions of mineral acids, e.g. HCl, $H_2SO_4$, $HNO_3$. However, hydrofluoric acid should not be used since it dissolves the silica-rich phase. The temperature of the leaching bath is generally about 90–100° C. with about 95° C. being preferred. As the temperature of the bath falls below 90° C., there is less thorough extraction and a substantial increase in the extraction time. We have found that below 85° C., the rate of leaching becomes too slow. The leaching time is to some extent dependent upon the concentration of the acid and the temperature of the bath. A typical leaching schedule involves leaching the glass for two days in a 1.5 N solution of nitric acid at about 95° C., then rinsing in a fresh solution of the same acid strength and finally rinsing in a dilute, 0.2 N, solution of nitric acid for one day. Sometimes prior to leaching, it may be desirable to subject the glass to a preliminary etch treatment to remove the surface skin and thereby permit a more uniform penetration of acid into the body of the glass. Preliminary etching is recommended for thick walled tubing and also when the surface of the glass has become contaminated on storage. A typical preliminary etching may be performed by dipping in a 15 wt. percent $NH_4F \cdot HF$ solution for 10 minutes.

The porous glass body obtained after the leaching step must have a very fine network of pores. The pore size must be in the range of 10–25 A. In order to obtain such a fine network of pores, heat treatment prior to leaching must be avoided. The reason will become readily apparent when we discuss the foaming mechanism. Briefly, the fine pores entrap moisture which serves to expand the foam. In comparison, phase separating glasses which have been subjected to a prior heat treatment yield porous glass with large pores, e.g. 50 A. and greater, from which moisture can escape.

The next step involves impregnating the porous glass with a boric acid solution which acts as a flux and becomes incorporated in the glass structure as $B_2O_3$. Further, the presence of boric acid reduces the sintering temperature and aids in the closing of the pores to minimize escape of moisture. Omission of the boric acid impregnation results in a weak foam. The boric acid, to some extent, also aids foaming since upon decomposition moisture is given off as shown in the equation:

$$2H_3BO_3 \rightarrow B_2O_3 + 3H_2O$$

In preparing the solution, it should be taken into account that the solubility of boric acid in water increases considerably at elevated temperatures and is about 27.6 g./100 cc., $H_2O$ at 100° C. For practical purposes the solution should be at least slightly below the saturation point. We prefer to use a concentration of 15–20 g. $H_3BO_3$/100 cc. $H_2O$. Hot impregnation is preferred at temperatures of 90–100° C. The time for impregnation is usually at least three hours with longer times being permissible. After impregnation, the sample is air dried at room temperature. Other conventional drying techniques, e.g. dessication, may also be used.

The dried material is crushed into small particles taking care not to introduce contaminants. The material is quite friable at this point and may be particulated using a roll crusher. Good yields of fractions of both coarse and fine particles are obtained when the gap setting of the rolls is about 0.090 in. The setting may be adjusted to give coarser or fined particles. However, ball milling is not desirable since this results in excessive fines and tends to introduce contamination. When the starting material is in the form of particles, crushing may be eliminated.

The crushed particles are now screened by conventional procedures. The density of the foam is directly related to the particle size, i.e. the finer the particles, the denser the foam and vice versa. This may be explained by the fact that smaller particles pack more densely and degas easier, and in addition, then tend to entrap less moisture. Typical values for particle sizes given in terms of U.S. Standard Sieves for specific foam densities and the percentages by weight are listed in the table below. It should be noted that these values are also to some extent influenced by the firing temperature, the impregnation time, and the geometry of the firing mold.

TABLE I

Grain size vs. density

| Density g./cc.: | Mesh classification: |
|---|---|
| 0.22 | −4 +20 |
| 0.33 | 50% −20 +40 |
| | 50% +20 |
| 0.45 | −20 +40 |
| 0.55 | −20 +60 |
| 0.55 | 50% −20 +40 |
| | 50% −60 +fines |
| 0.62 | 50% −40 +60 |
| | 50% −20 +60 |
| 0.70 | 75% −60 +fines |
| | 25% −20 +40 |
| 0.70 | 75% −40 +60 |
| | 25% −20 +60 |
| 0.80 | −40 +60 |
| 0.89 | 90% −60 +fines |
| | 10% −20 +40 |
| 1.0 | 90% −60 +fines |
| | 10% −20 +60 |
| 1.0 | 75% −40 +fines [1] |
| | 25% −20 +60 |

[1]  Nonporous glass particles having the identical composition.

The porous particles are then subjected to a particle drying procedure to remove some of the mechanically held water. The purpose is to prevent gas pockets or voids from being formed when the porous glass particles are flash-fired. If the glass particles are not partially dried, a nonuniform foam is produced. It is recommended to place the particles in a furnace mold that will also be used in the final sintering step. The samples are preheated at a temperature ranging from about 200–500° C., but the temperature should not exceed 600° C. The heating time varies from 2–5 hours depending on the thickness and size of the glass particles and the depth of the charge being dried.

The porous glass particles, which have previously been partially dried, are then sintered and foamed almost simultaneously. The foaming agent is water vapor which is derived primarily from the water of constitution (silanol groups) and also from the decomposition of boric acid. Expansion of the porous glass granules and the sintering of the granules occurs at temperatures of 1300–1425, with about 1400° C. being preferred. The glass must be flash fired so that the pores are closed very rapidly to prevent escape of the water vapor liberated by the glass and the boric acid. The particles expand near the final firing temperature. At this point the glass is fluid enough to permit movement and is in a viscosity range so that it can expand, but the temperature is still below the softening point of the glass.

Specific procedures for molding foamed articles are given in the following examples.

EXAMPLE 1

Porous particles of a leached borosilicate glass were impregnated with an aqueous solution of boric acid. The dried particles having a grain size of −20 to +40 mesh U.S. Standard Sieve and a pore size of 10–25 A were placed in a Vycor tray lined with an alumina-silica ceramic fiber. The tray was placed into an oven at a temperature of 500° C. for a period of 2 hours. Thereafter the tray was immediately transferred to an oven at a temperature of 1400° C. for a period of 2 hours. The resulting foam had a density of 0.5 gms./cc. The foam was then machined to the desired shape.

EXAMPLE 2

A slip casting mixture was prepared using an aqueous vehicle, presaturated with boric acid, and consolidated 96% silica particles substantially passing through a 325 mesh screen. To this mixture were added porous glass particles having a size of −20 to +60 mesh sieve and which had been impregnated with boric acid as described hereinabove.

The final mixture contained 40% by weight porous glass particles and 60% by weight consolidated glass particles based on the ceramic content of the slip. Thereafter the new mixture was dispersed by rolling in a six gallon plastic bottle for 16 hours and drain cast in a conically shaped mold to a piece having a thickness of ⅝ inch. Any loss of boric acid during slip casting was considered to be negligible. The piece was allowed to dry at room temperature for 24 hours and then placed under radiant heaters for about 3 days.

The piece was thereafter preheated for 16 hours at a temperature of 450° F. and thereafter fired in a kiln at 1350° C. The resulting product had a density of 0.47 gm./cc.

Unlike the conventional glass foams discussed hereinabove, the low-expansion, high-silica glass foams do not require annealing.

It will be appreciated that the invention is not limited to the specific details shown in the illustrations and examples, and that various modifications may be made within the ordinary skill in the art without departing from the spirit and scope of the invention.

We claim:

1. A method of making a high-silica glass foam comprising the steps of:
   (a) forming a body of a borosilicate glass containing a maximum of 70% by weight of silica capable of separating into a silica-rich phase and a silica-poor phase;
   (b) leaching the silica-poor phase to produce a porous high-silica body having a pore size in the range of 10–25 A.;
   (c) impregnating the porous body with an aqueous boric acid solution at a temperature of 90–100° C. for a sufficient time;
   (d) particulating the impregnated glass;
   (e) drying the particulated material at a temperature of 200–500° C. to remove excess water; and
   (f) foaming the particulated material at an elevated temperature of about 1300–1425° C. to form a fused foamed glass body.

2. The method of making the glass foam of claim 1, wherein the density of the product is in the range of 0.22–1.0 gm./cc.

3. The method of claim 1, wherein said boric acid solution contains about 15–20 grams $H_3BO_3$ per 100 cc. of water.

4. The method of claim 1, wherein said dried particulated material is molded into a foamed article.

5. The method of claim 1, wherein the particulated material is slip cast prior to the foaming step.

6. The method of claim 2, wherein the leaching step is performed using a dilute mineral acid solution.

7. The method of claim 1, wherein the borosilicate glass consists essentially as calculated from the batch in weight percent on the oxide basis of:

| Ingredient: | Range, percent |
|---|---|
| $SiO_2$ | 55–70 |
| $B_2O_3$ | 20–40 |
| $R_2O$ | 1–10 |
| $Al_2O_3$ | 0–5 | wherein R is an alkali metal.

8. The method of claim 7 wherein said borosilicate glass consists essentially as calculated from the batch in weight percent on the oxide basis of:

| Ingredient: | Range, percent |
|---|---|
| $SiO_2$ | 58–65 |
| $B_2O_3$ | 20–30 |
| $R_2O$ | 4–9 |
| $Al_2O_3$ | 0–3 | wherein R is an alkali metal.

9. The method of claim 8 wherein said composition consists essentially of:

| Ingredient: | Amount |
|---|---|
| $SiO_2$ | 61.6 |
| $Na_2O$ | 8.04 |
| $B_2O_3$ | 28.2 |
| $Al_2O_3$ | 1.9 |
| $As_2O_3$ | 0.3 |

References Cited

UNITED STATES PATENTS

| 2,215,039 | 9/1940 | Hood et al. | 65—31 |
| 2,336,227 | 12/1943 | Dalton | 65—31 |
| 2,355,746 | 8/1944 | Nordberg | 65—31 |
| 2,691,248 | 10/1954 | Ford | 65—22X |
| 2,834,738 | 5/1958 | Vincent | 65—18X |
| 3,149,946 | 9/1964 | Elmer | 65—31X |
| 3,485,687 | 12/1969 | Chapman | 65—31X |
| 3,505,089 | 4/1970 | Rostoker | 65—22X |
| 3,513,106 | 5/1970 | Chapman | 65—31X |

FOREIGN PATENTS

| 178,726 | 3/1966 | U.S.S.R. | 106—40 |

FRANK W. MIGA, Primary Examiner

U.S. Cl. X.R.

65—18, 19, 20, 31; 106—40